United States Patent
Taniguchi

(10) Patent No.: US 8,655,150 B2
(45) Date of Patent: Feb. 18, 2014

(54) MOVING IMAGE EDITING APPARATUS AND CONTROL METHOD THEREFOR

(75) Inventor: Manabu Taniguchi, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 13/163,220

(22) Filed: Jun. 17, 2011

(65) Prior Publication Data

US 2012/0014671 A1 Jan. 19, 2012

(30) Foreign Application Priority Data

Jul. 16, 2010 (JP) ................................. 2010-162208

(51) Int. Cl.
*H04N 5/93* (2006.01)

(52) U.S. Cl.
USPC .......................................... 386/278; 386/281

(58) Field of Classification Search
None
See application file for complete search history.

(56) References Cited

U.S. PATENT DOCUMENTS 6,085,020 A * 7/2000 Saito et al. ..................... 386/327
2007/0269180 A1* 11/2007 Shinkai et al. .................. 386/52

FOREIGN PATENT DOCUMENTS

JP 2001-346085 12/2001
JP 2004-328073 11/2004

* cited by examiner

*Primary Examiner* — William C Vaughn, Jr.
*Assistant Examiner* — Asher Khan
(74) *Attorney, Agent, or Firm* — Cowan, Liebowitz & Latman, P.C.

(57) ABSTRACT

An apparatus for editing a series of moving images recorded across a plurality of recording media including at least a first and second recording media, comprising: an editing unit which performs editing processing on a part of the series of moving images recorded on the first recording medium; a storage control unit which performs control such that the editing processing is stored; a determination unit which determines whether or not a detachable recording medium has been attached; and a control unit which, in a case where it has been determined that the second recording medium has been attached, performs control for applying the editing processing that has been performed on the part of the series of moving images recorded on the first recording medium and has been stored by the storage control unit, to a part of the series of moving images that is recorded on the second recording medium.

20 Claims, 12 Drawing Sheets

F I G. 2
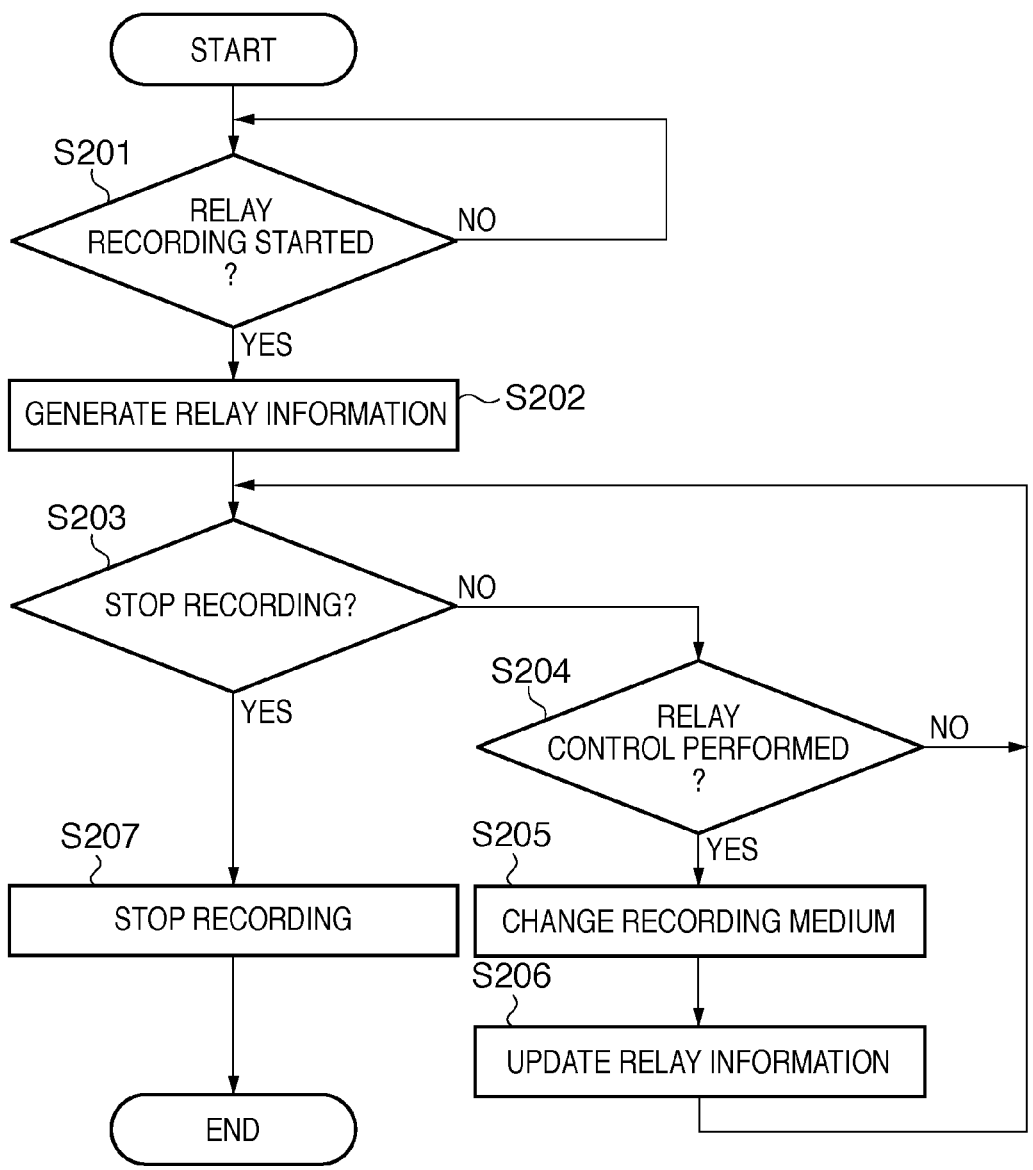

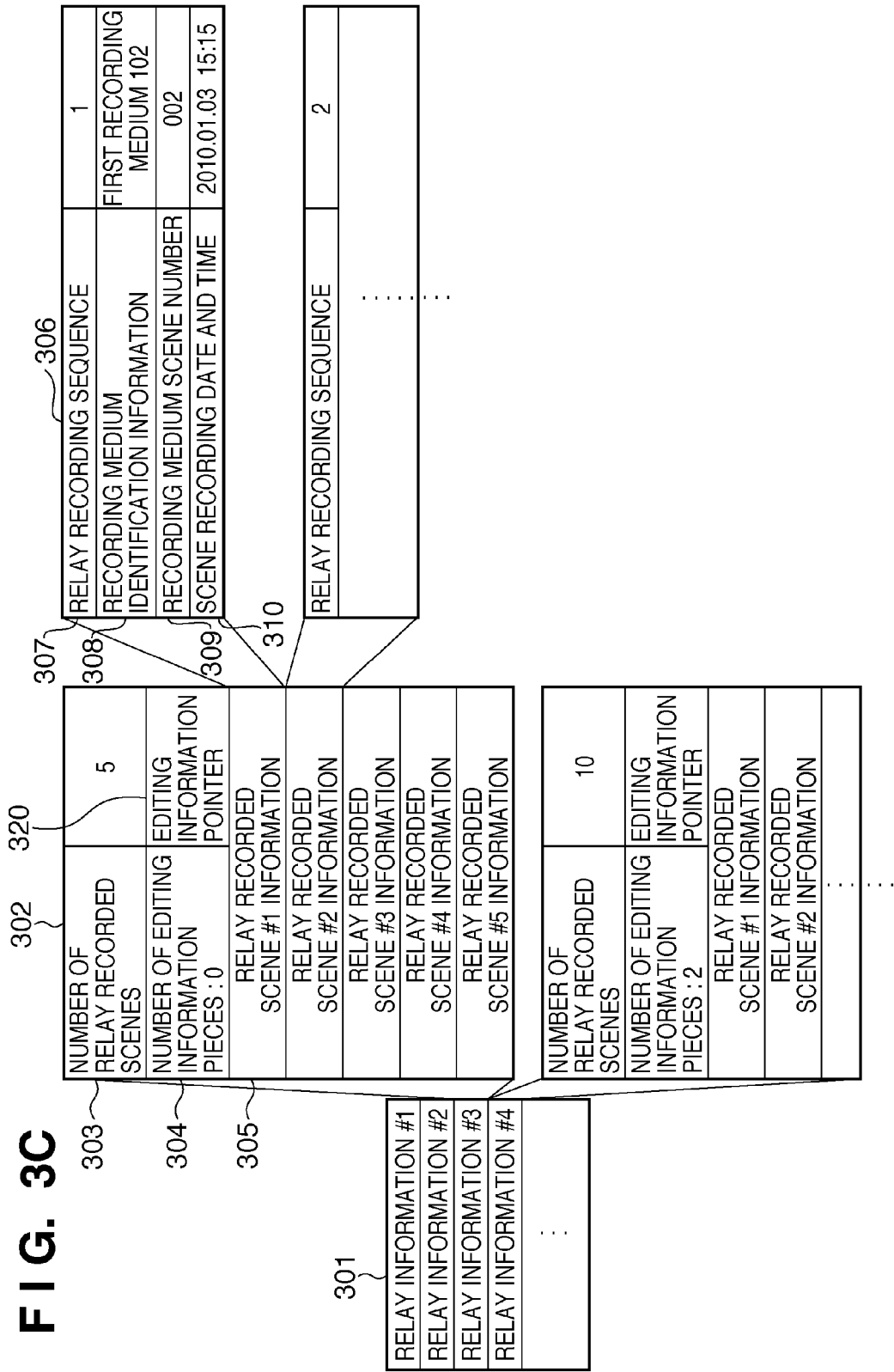

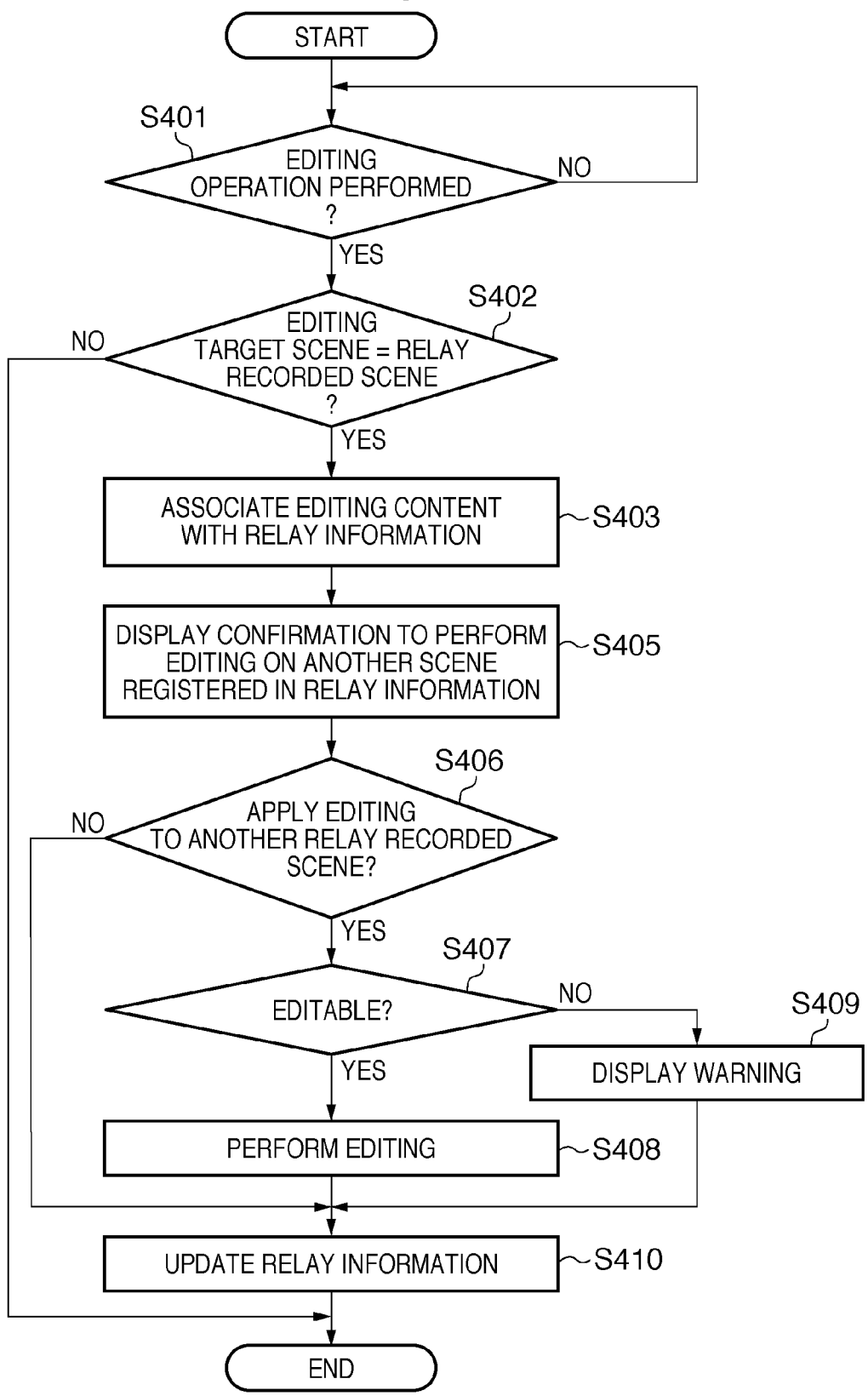

F I G. 5A

A PART OF RELAY RECORDED SCENES HAS BEEN EDITED.

[RELAY INFORMATION #] #1
[EDITED RELAY RECORDED SCENES]
 RELAY RECORDED SCENE #1 : DELETED (FIRST RECORDING MEDIUM)
[OTHER RELAY RECORDED SCENES]
 RELAY RECORDED SCENE #2 : UNPROCESSED (SECOND RECORDING MEDIUM)
 RELAY RECORDED SCENE #3 : UNPROCESSED (THIRD RECORDING MEDIUM)

APPLY EDITING TO OTHER RELAY RECORDED SCENES?

Yes  No

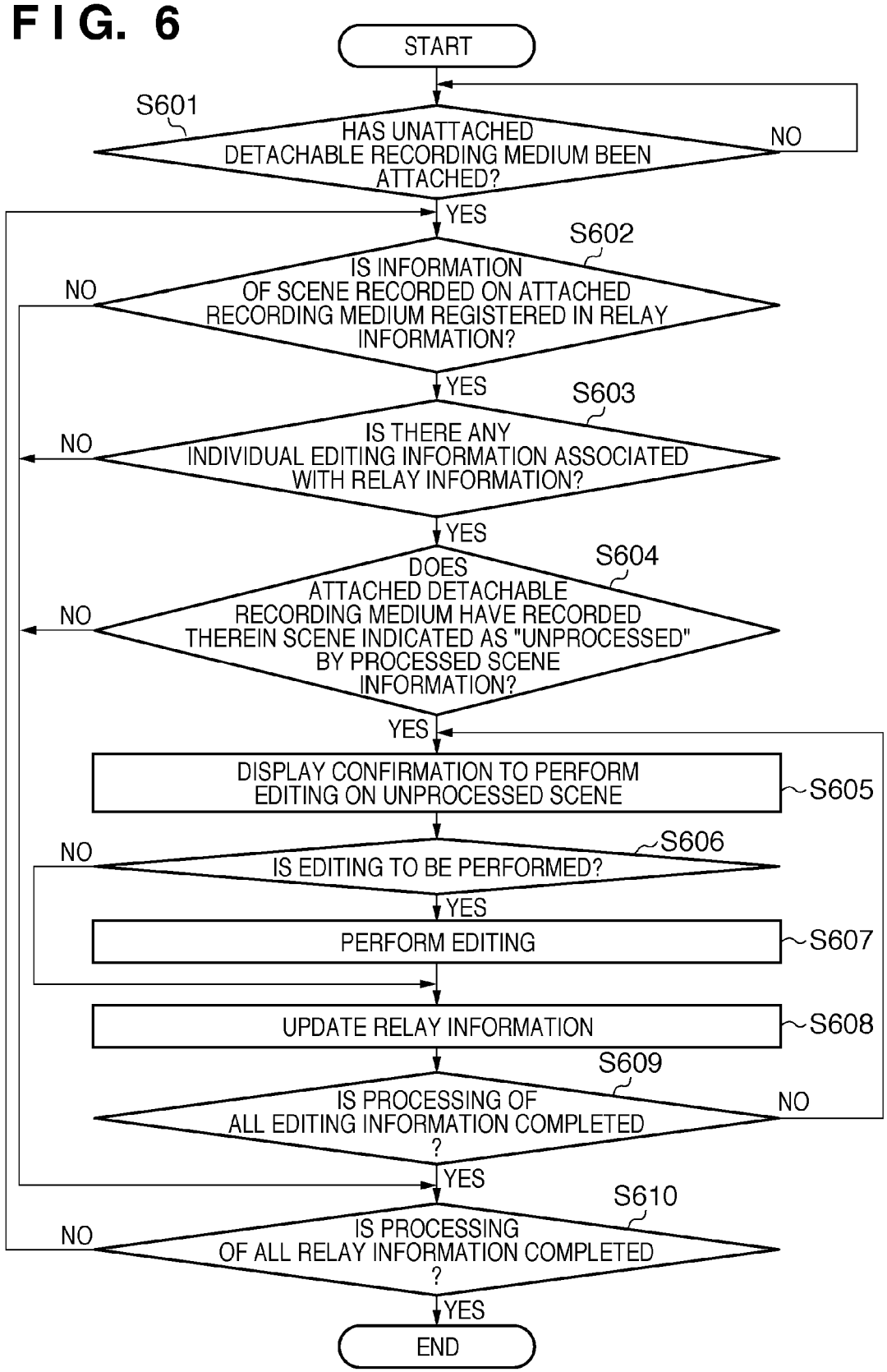

F I G. 7C

| | |
|---|---|
| ~704H EDITED RECORDING MEDIUM IDENTIFICATION INFORMATION | THIRD RECORDING MEDIUM 104 |
| EDITED SCENE NUMBER | 1 |
| INDIVIDUAL EDITING CONTENT | MOVE TO FIRST RECORDING MEDIUM 102 |
| SCENE RECORDING DATE AND TIME | 2009.05.21  15:31 |
| PROCESSED SCENE INFORMATION | #1 PROCESSED : #2 UNPROCESSED : #3 PROCESSED |
| EDITING INFORMATION POINTER | |

MOVING IMAGE EDITING APPARATUS AND CONTROL METHOD THEREFOR

BACKGROUND OF THE INVENTION

1. Field of the Invention

The present invention relates to moving image editing technology for editing a series of moving images recorded across multiple recording media.

2. Description of the Related Art

Recently, image capturing apparatuses such as digital still cameras and digital video cameras that are equipped with both a built-in recording medium and a detachable recording medium are commercially available. With such image capturing apparatuses, a user can designate a recording medium serving as a recording destination on which still images or moving images captured by the user are recorded. There are also products that support long-duration recording, in which in a case where the remaining amount of a user-designated recording medium serving as a recording destination becomes lower than a predetermined value, subsequent images continue to be recorded on another recording medium.

Japanese Patent Laid-Open No. 2004-328073 discloses technology for recording a series of moving images across multiple recording media. According to the disclosure of Japanese Patent Laid-Open No. 2004-328073, in a case where writing is denied at the time when a moving image (DSCF1001B.AVI), which is continued from a moving image (DSCF1001A.AVI) recorded on a first recording medium, starts to be recorded on a second recording medium, the moving image DSCF1001A.AVI that has been recorded on the first recording medium is erased together with the moving image DSCF1001B. AVI recorded on the second recording medium. Japanese Patent Laid-Open No. 2001-346085 discloses technology for performing control such that, upon receipt of an instruction to delete a part of a series of still images obtained by continuous shooting, all of the series of associated continuous images are deleted.

However, in Japanese Patent Laid-Open Nos. 2004-328073 and 2001-346085, in a case where a series of moving images have been recorded across a first recording medium built in the apparatus and a second recording medium detachable from the apparatus, if the second recording medium is not attached to the apparatus when certain editing processing has been performed on a part of the data that is recorded on the first recording medium, the same editing processing cannot be reflected on the other part of the data that is recorded on the second recording medium.

SUMMARY OF THE INVENTION

The present invention has been made in consideration of the aforementioned problems, and realizes technology that, in a case where a series of moving images are recorded across multiple recording media, enables editing processing performed on a given moving image recorded on one of the recording media, to be reflected on another moving image recorded on another one of the recording media that was not attached at the time of execution of the editing processing.

In order to solve the aforementioned problems, the present invention provides a moving image editing apparatus for editing a series of moving images recorded across a plurality of recording media including at least a first recording medium and a second recording medium, the apparatus comprising: an editing unit configured to perform editing processing on a part of the series of moving images that is recorded on the first recording medium; a storage control unit configured to perform control such that the editing processing performed by the editing unit is stored; an attachment determination unit configured to determine whether or not a detachable recording medium has been attached; and a control unit configured to, in a case where the attachment determination unit has determined that the second recording medium has been attached, perform control for applying the editing processing that has been performed on the part of the series of moving images recorded on the first recording medium and has been stored by the storage control unit, to a part of the series of moving images that is recorded on the second recording medium.

In order to solve the aforementioned problems, the present invention provides a control method for a moving image editing apparatus for editing a series of moving images recorded across a plurality of recording media including at least a first recording medium and a second recording medium, the control method comprising: an editing step of performing editing processing on a part of the series of moving images that is recorded on the first recording medium; a storage control step of performing control such that the editing processing performed in the editing step is stored; an attachment determination step of determining whether or not a detachable recording medium has been attached; and a control step of, in a case where it has been determined in the attachment determination step that the second recording medium has been attached, performing control for applying the editing processing that has been performed on the part of the series of moving images recorded on the first recording medium and has been stored in the storage control step, to a part of the series of moving images that is recorded on the second recording medium.

In order to solve the aforementioned problems, the present invention provides a moving image editing apparatus for editing a series of moving images recorded across a plurality of recording media including at least a first recording medium and a second recording medium, the apparatus comprising: an editing unit configured to perform editing processing on a part of the series of moving images that is recorded on the first recording medium; a storage control unit configured to perform control such that the editing processing performed by the editing unit is stored; and a control unit configured to perform control for applying the editing processing that has been performed on the part of the series of moving images recorded on the first recording medium and has been stored by the storage control unit, to a part of the series of moving images that is recorded on the second recording medium.

In order to solve the aforementioned problems, the present invention provides a moving image editing apparatus for editing a series of moving images recorded across a plurality of recording media including at least a first recording medium and a second recording medium, the apparatus comprising: an editing unit configured to perform editing processing on a part of the series of moving images that is recorded on the first recording medium; and a control unit configured to perform control for applying the editing processing performed on the part of the series of moving images recorded on the first recording medium, to a part of the series of moving images that is recorded on the second recording medium.

In order to solve the aforementioned problems, the present invention provides a control method for a moving image editing apparatus for editing a series of moving images recorded across a plurality of recording media including at least a first recording medium and a second recording medium, the control method comprising: an editing step of performing editing processing on a part of the series of moving images that is recorded on the first recording medium; a storage control step of performing control such that the editing processing performed in the editing step is stored; and a control step of performing control for applying the editing processing that has been performed on the part of the series of moving images recorded on the first recording medium and has been stored in the storage control step, to a part of the series of moving images that is recorded on the second recording medium.

In order to solve the aforementioned problems, the present invention provides a control method for a moving image editing apparatus for editing a series of moving images recorded across a plurality of recording media including at least a first recording medium and a second recording medium, the control method comprising: an editing step of performing editing processing on a part of the series of moving images that is recorded on the first recording medium; and a control step of performing control for applying the editing processing performed on the part of the series of moving images recorded on the first recording medium, to a part of the series of moving images that is recorded on the second recording medium.

According to the present invention, in a case where a series of moving images are recorded across multiple recording media, editing processing performed on a given moving image recorded on one of the recording media can be reflected on another moving image recorded on another one of the recording media that was not attached at the time of execution of the editing processing.

Further features and aspects of the present invention will become apparent from the following detailed description of exemplary embodiments with reference to the attached drawings.

BRIEF DESCRIPTION OF THE DRAWINGS

FIG. 2 is a flowchart showing processing for generating relay information according to the embodiment.

FIGS. 3A to 3C are diagrams illustrating relay information according to the embodiment.

FIG. 4 is a flowchart showing editing processing according to the embodiment.

FIGS. 5A and 5B are diagrams showing examples of displays described in step S405 of FIG. 4 and step S605 of FIG. 6.

FIG. 6 is a flowchart showing processing performed in a case where a detachable recording medium has been attached, according to the embodiment.

FIGS. 7A to 7C are diagrams illustrating the relay information according to the embodiment.

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

Figure 1:
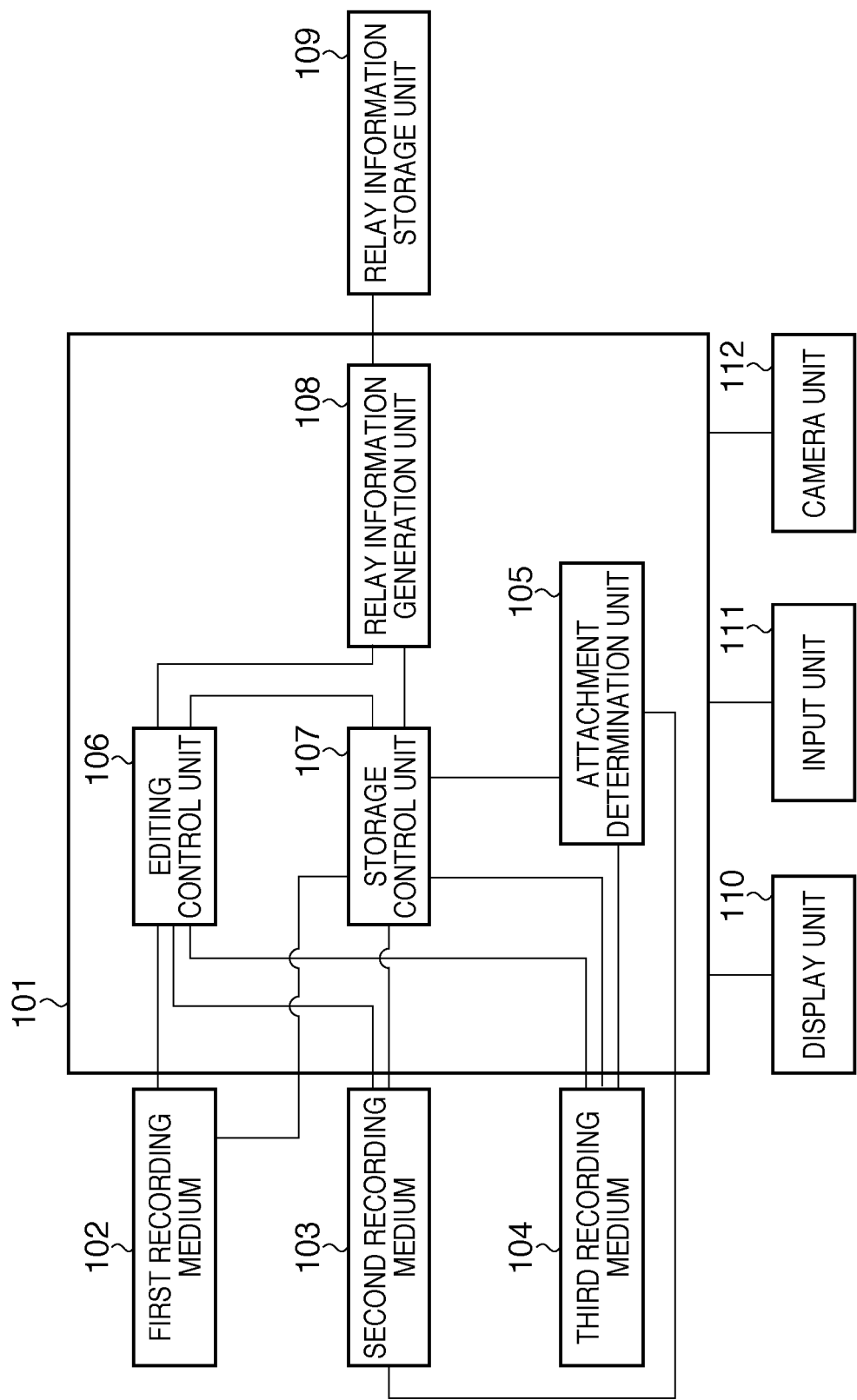
FIG. 1 is a block diagram showing a schematic configuration of a moving image editing apparatus according to an embodiment of the present invention.

First, a schematic configuration of a moving image editing apparatus according to an embodiment is described with reference to FIG. 1. In FIG. 1, the moving image editing apparatus according to the present embodiment is mounted in an image capturing apparatus such as a digital video camera. A main control unit 101 controls each unit of the image capturing apparatus. The main control unit 101 includes an attachment determination unit 105, an editing control unit 106, a storage control unit 107, and a relay information generation unit 108, which will be described later.

A first recording medium 102, a second recording medium 103, and a third recording medium 104 record moving images captured by the image capturing apparatus of the present embodiment. In the present embodiment, not only moving image data but also other data, such as still image data or audio data, is applicable. The first recording medium 102 is, for example, a hard disk built in the image capturing apparatus, and the second and third recording media 103 and 104 are, for example, memory cards detachable from the image capturing apparatus. Note that although a configuration employing three types of recording media, namely, the first to third recording media 102 to 104, is illustrated in the present embodiment, the present invention may be applied to other configurations as long as the configurations enable a series of moving images obtained by continuous shooting to be recorded across multiple recording media.

The attachment determination unit 105 detects whether or not the second and third recording media 103 and 104 are attached (connected) to the image capturing apparatus. Attachment of the second and third recording media 103 and 104 to the image capturing apparatus means a state of connection between the image capturing apparatus and the second and third recording media 103 and 104. Non-attachment of the second and third recording media 103 and 104 to the image capturing apparatus means a state of no-connection between the image capturing apparatus and the second and third recording media 103 and 104.

The editing control unit 106 controls various types of editing processing that are performed on moving images recorded on the first to third recording media 102 to 104. The term "editing processing" as used herein refers to editing processing performed on moving images recorded on recording media, and includes, for example, deleting a part of scenes in a moving image, and setting or canceling protection against accidental erasure of moving images. The editing processing also includes copy to the same or another recording medium, move to another recording medium, and registration or addition to a play list. The editing processing further includes print designation and transfer designation, which are automatically performed at the time of connection to external equipment, and scene selection for applying the content of editing performed on a certain scene to a selected scene.

The present embodiment is applicable to any example of the above-described editing processes, and the following description takes the example of a case where the present embodiment is applied to some of the editing processes. Note that in the following description, a single "scene" refers to a moving image stream recorded in a single moving image file. A "relay moving image" refers to a moving image stream recorded from the start to the end of an instruction to record a moving image during relay recording. In other words, a single relay moving image is formed of multiple scenes (multiple moving image files) recorded across multiple recording media. Each of multiple scenes included in a single relay moving image is referred to as a "relay recorded scene".

The storage control unit 107 performs control for executing relay recording in which captured moving images are recorded across multiple recording media (relay control described later in step S204 of FIG. 2). After the relay recording is completed, the storage control unit 107 sends information regarding relay control to the relay information generation unit 108, and the relay information generation unit 108 stores such relay control information and recording destination information as relay information in a relay information storage unit 109.

The relay information generation unit 108 reads the relay information stored in the relay information storage unit 109 as necessary and sends the relay information to the editing control unit 106. Also, in a case where the editing control unit 106 performs editing processing on a moving image recorded on a recording medium, the relay information generation unit 108 references the relay information stored in the relay information storage unit 109, and if a scene targeted for editing is recorded in the relay information, updates the relay information by, for example, adding an editing content.

A display unit 110 is constituted by, for example, an LCD or an EVF, and displays, for example, the operating state of the image capturing apparatus, user operations, and a confirmation screen or a warning, which will be described later. An input unit 111, which is constituted by for example buttons or a touch panel, receives user operations performed on the image capturing apparatus and outputs operation instructions input by a user to the main control unit 101. A camera unit 112 includes, for example, a lens through which an image of a subject is formed, an image sensor that acquires light that forms an image through the lens as an electric signal, and an image processing circuit that generates a moving image by performing A/D conversion processing, development processing, and so on the electric signal generated by the image sensor.

Moving images generated by the image processing circuit are output to the main control unit 101 and recorded by the storage control unit 107 in relays across the first recording medium 102, the second recording medium 103, and the third recording medium 104.

Relay Information Generation Processing

Here, relay information generation processing according to the present embodiment is described with reference to FIGS. 2, 3, and 7. Note that in the present embodiment, moving images captured by the camera unit 112 are recorded by the storage control unit 107 in relays in the order of the first recording medium 102, the second recording medium 103, and the third recording medium 104. Specifically, when relay recording is started upon receipt of a user operation, moving images are first recorded on the first recording medium 102. Thereafter, in cases such as a case where the remaining amount of the first recording medium 102 becomes lower than a predetermined value or a case where a user operation is received, the recording destination of moving images is switched from the first recording medium 102 to the second recording medium 103, and subsequent images continue to be recorded. If the same condition as described above is satisfied for the second recording medium 103, the recording destination is switched from the second recording medium 103 to the third recording medium 104, and the recording continues.

Note that the second and third recording media 103 and 104 are attached to the apparatus at the time of recording of moving images, with each recording medium having been initialized in advance and containing no recorded data other than moving images to be recorded in relays. The condition for starting relay recording and the condition for switching a recording destination are not intended to be limited to the above examples, and other conditions are also applicable.

A specific example of the processing content is described next with reference to the flowchart of FIG. 2. In FIG. 2, the main control unit 101 monitors whether or not an instruction to start relay recording has been input by a user operation through the input unit 111 (step S201). If the relay recording start instruction has been input in step S201, the storage control unit 107 records a moving image input from the camera unit 112 on the first recording medium 102 as a moving image of a relay recorded scene #1 in a relay moving image. When the recording of moving images on the first recording medium 102 is started, the relay information generation unit 108 generates relay information regarding the relay moving image currently being recorded, and stores the generated relay information in the relay information storage unit 109 (step S202). A single relay information piece is generated for each relay moving image.

Furthermore, identification information of the recording medium serving as a recording destination is generated in sequence for at least each relay recorded scene recorded in relays, and is stored in the relay information storage unit 109. For example, a relay information piece #1 is generated such that the first recorded scene, out of a series of relay recorded scenes included in a single relay moving image, is named as a relay recorded scene #1 and associated with the identification information of the first recording medium 102 serving as a recording destination. The relay information generated in this processing will be discussed later with reference to FIGS. 3A to 3C.

Referring back to FIG. 2, the main control unit 101 monitors whether or not a predetermined condition for stopping the relay recording is satisfied during relay recording (step S203). Conceivable examples of the relay recording stop condition include a case where an instruction to stop relay recording is input by a user operation through the input unit 111, a case where the total of the remaining amounts of the recording media attached to the image capturing apparatus becomes lower than a minimum recordable amount, and a case where it is determined that recording is impossible due to, for example, problems of the recording medium. If the recording stop condition is satisfied in step S203, the main control unit 101 stops the relay recording (step S207) and ends the processing.

If the recording stop condition is not satisfied, the storage control unit 107 determines whether or not relay control for switching the recording medium serving as a recording destination is to be performed (step S204). Although the condition for performing relay control varies depending on the apparatus, in the present embodiment, it is the case where the remaining amount of the recording medium currently recording moving images becomes lower than a predetermined value. Accordingly, in step S204, the main control unit 101 determines that relay control is to be performed in the case where the remaining amount of the first recording medium 102 becomes lower than a predetermined value, and changes the recording medium serving as a recording destination (step S205). More specifically, in the case where the recording destination prior to change is the first recording medium 102, the recording destination is changed to the second recording medium 103. In the case where the recording destination prior to change is the second recording medium 103, the recording destination is changed to the third recording medium 104. Furthermore, in the case where the recording destination prior to change is the third recording medium 104, the recording destination is changed to the first recording medium 102. On the other hand, if it has been determined in step S204 that relay control is not to be performed, the main control unit 101 again monitors whether or not the relay recording stop condition is satisfied (step S203).

If the recording medium serving as a recording destination is changed by relay control (step S205), the relay information generation unit 108 updates the relay information stored in the relay information storage unit 109 (step S206). Because the number of scenes included in the same relay moving image is increased by one when the recording medium serving as a recording destination is changed, one more relay recorded scene # is added to the relay information piece #1 and stored in the relay information storage unit 109 together with the identification information of the changed recording medium serving as a recording destination. In the present embodiment, for example, the identification information of the second recording medium 103 serving as a recording destination is added to the relay information piece #1 as a relay recorded scene #2. Thereafter, the main control unit 101 again monitors whether or not the relay recording stop condition is satisfied (step S203).

Furthermore, in the case where the remaining amount of the second recording medium 103 becomes lower than a predetermined value during recording of the relay moving image, the recording destination of moving images is changed from the second recording medium 103 to the third recording medium 104 (step S205), and the relay information is updated (step S206). In this case, the identification information of the third recording medium 104 serving as a recording destination is added to the relay information piece #1 as a relay recorded scene #3.

Figure 3A:
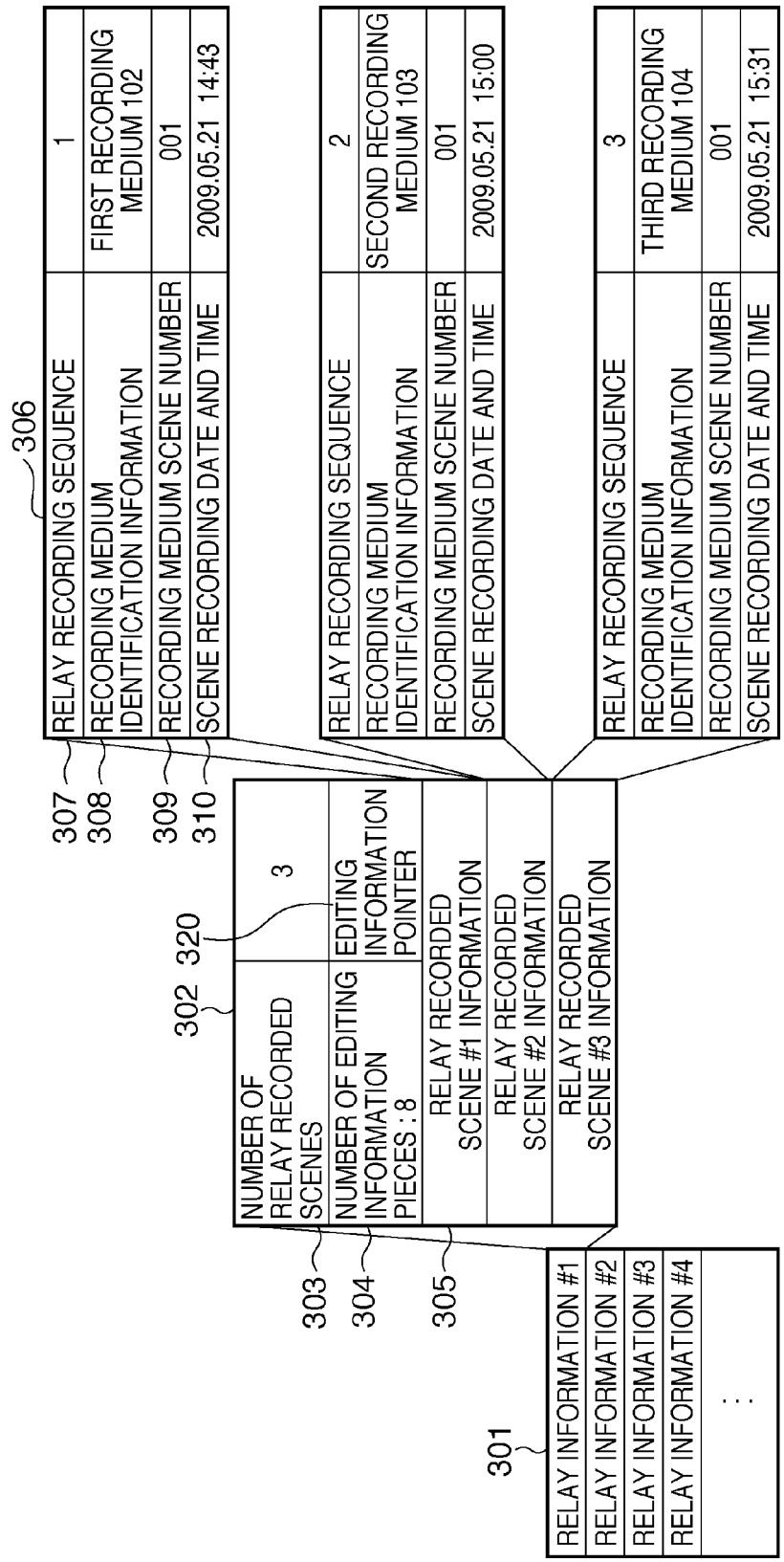
Figure 3B:
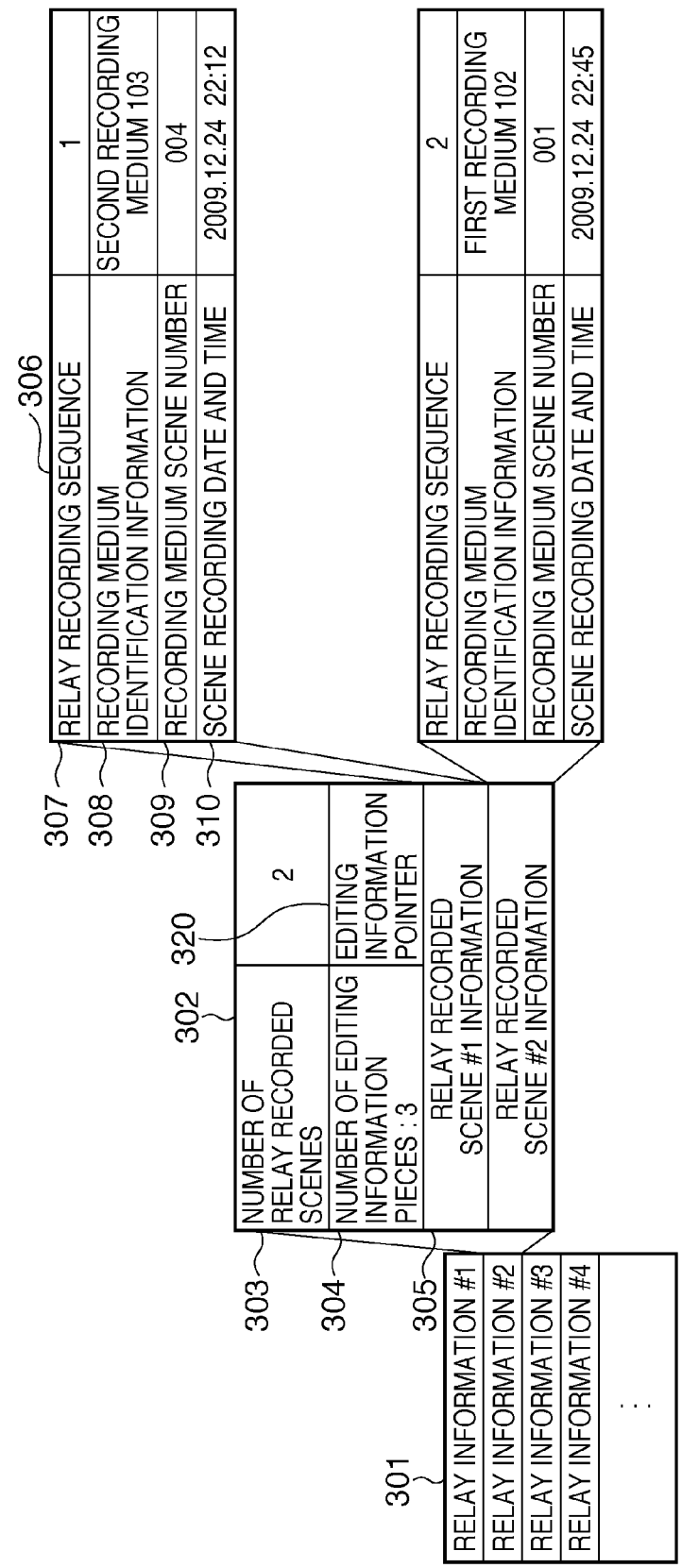

Next is a description of the relay information generated in step S202 or updated in step S206, with reference to FIGS. 3A to 3C. The relay information is primarily a group of information pieces regarding recording destinations (locations) of moving images obtained during a single execution of relay recording (from the start to the end of recording), a single relay information piece being generated for each execution of relay recording. Specifically, in FIGS. 3A to 3C, four relay information pieces #1 to #4 are shown as relay information pieces 301, which indicates that there are four relay moving images. If relay recording is performed again in this condition, a relay information piece #5 is added. As will be described later, there are cases in which a relay information piece that becomes unnecessary as a result of editing processing is deleted.

Reference numeral 302 denotes registration information included in a relay information piece 301. A single relay information piece includes data constituted by the number of relay recorded scenes 303 that have been recorded, the number of editing information pieces 304 indicating the number of editing processes performed on relay recorded scene information pieces 305, an editing information pointer 320 used to access detailed contents of the editing information pieces, and the relay recorded scene information pieces 305. A single value for the number of relay recorded scenes 303 is registered for each relay information piece 301. A single relay recorded scene information piece 305 is registered for each relay recorded scene (a single moving image file recorded on a single medium) registered in a relay information piece 301. That is, a single relay information piece 301 has registered therein multiple relay recorded scene information pieces 305. Furthermore, a single relay information piece has registered therein multiple editing information pieces associated with the relay information piece by the editing information pointer 320. Details of the editing information pieces associated with the relay information piece by the editing information pointer 320 will be described later with reference to FIGS. 7A to 7C. Before editing is performed on a relay moving image, such as at the time of generation of the relay information when the recording of the relay moving image is started, the relay information includes no editing information, in which case the number of editing information pieces 304 is zero, and the editing information pointer 320 indicates Null.

A relay recorded scene information piece 305 is data regarding each relay recorded scene that has been recorded in relays, and reference numeral 306 denotes detailed information of the relay recorded scene information piece. A single relay recorded scene information piece includes a relay recording sequence 307, recording medium identification information 308, a recording medium scene number 309, and a scene recording date and time 310. The relay recording sequence 307 is information indicating where the scene is located among the scenes recorded by a single relay recording operation. The relay recording sequence 307 in FIGS. 3A to 3C indicate that the scene is the first recorded scene.

The recording medium identification information 308 is identification information (ID) of a recording medium serving as a recording destination, on which each scene has been recorded. This identification information is used by the apparatus to identify each individual recording medium and thus has a unique value. The recording medium scene number 309 is information indicating where the relay recorded scene is located among the relay recorded scenes recorded on the recording medium identified by the recording medium identification information 308.

The scene recording date and time 310 is information indicating the date and time when the relay recorded scene was recorded. Although the recording date and time are illustrated in the present embodiment, other information such as an ID or a data size may be used as long as the information enables identification of a relay recorded scene. The purpose of adding the recording date and time is to take into consideration possible cases where whether or not the scene is the scene registered in the relay information cannot be determined by only using the recording medium identification information 308 and the recording medium scene number 309.

At the start of relay recording shown in FIG. 2, for example, the number of relay recorded scenes 303 of "3", the number of editing information pieces 304 of "8", and the relay recorded scene information pieces #1 to #3 (305) are generated as the registration information 302 of the relay information piece #1 (301) in step S202. Each relay recorded scene information piece 305 is constituted by the detailed information 306. In the detailed information 306 is registered information including the relay recording sequence 307 of "1", the recording medium identification information 308 of "first recording medium 102", the recording medium scene number 309 of "001", and the scene recording date and time of "recording date and time of the scene #1".

When the relay control is performed for the first time, the number of relay recorded scenes 303 is updated to "2", and a relay recorded scene information piece 305 of a scene #2 is added in step S206. In the detailed information 306 of the scene #2 are registered the relay recording sequence 307 of "2", the recording medium identification information 308 of "second recording medium 103", the recording medium scene number 309 of "001", and the scene recording date and time of "recording date and time of the scene #2".

Similarly, when the relay control is performed for the second time, the number of relay recorded scenes 303 is updated to "3", and a relay recorded scene information piece 305 of a scene #3 is added in step S206. In the detailed information 306 of the scene #3 is registered information including the relay recording sequence 307 of "3", the recording medium identification information of "third recording medium 104", the recording medium scene number 309 of "001", and the scene recording date and time of "recording date and time of the scene #3".

In a case where relay recording of a new relay moving image is performed in a state in which there is already the relay information piece #1 (301), a new relay information piece #2 is generated and the detailed information as described above is registered.

As described above, the relay information pieces 301 generated by the relay information generation unit 108 executing the flowchart of FIG. 2 are stored in the relay information storage unit 109 and managed by the relay information storage unit 109.

Editing Processing

Next is a description of editing processing performed on relay recorded scenes with reference to FIGS. 3A to 3C, 4, and 5A and 5B.

Referring to FIG. 4, the editing control unit 106 monitors whether or not editing processing has been performed on relay recorded scenes recorded in the recording media (step S401). Examples of the editing processing include "deletion", "transfer designation", "protection setting", "scene selection", "print designation", "protection cancellation", "addition to a play list", "copy to another recording medium", and "move to another recording medium". If editing processing is performed under control of the editing control unit 106, the relay information generation unit 108 references the relay information pieces stored in the relay information storage unit 109. The relay information generation unit 108 then determines whether or not the scene that has undergone the editing processing (editing target scene) is a relay recorded scene included in the relay information pieces (step S402). This determination is made by sequentially comparing the information of the editing target scene and each relay recorded scene information piece included in each relay information piece. If the determination result in step S402 shows that the editing target scene is not included in the relay information pieces 301, the processing ends.

On the other hand, if the editing target scene is a relay recorded scene included in a relay information piece, a numerical value for the number of editing information pieces 304 in the corresponding relay information piece is incremented by one, and individual editing information indicating the executed editing content (described later with reference to FIGS. 7A to 7C) is generated and registered in the relay information piece by being associated with the relay information piece by the editing information pointer.

Figure 5B:
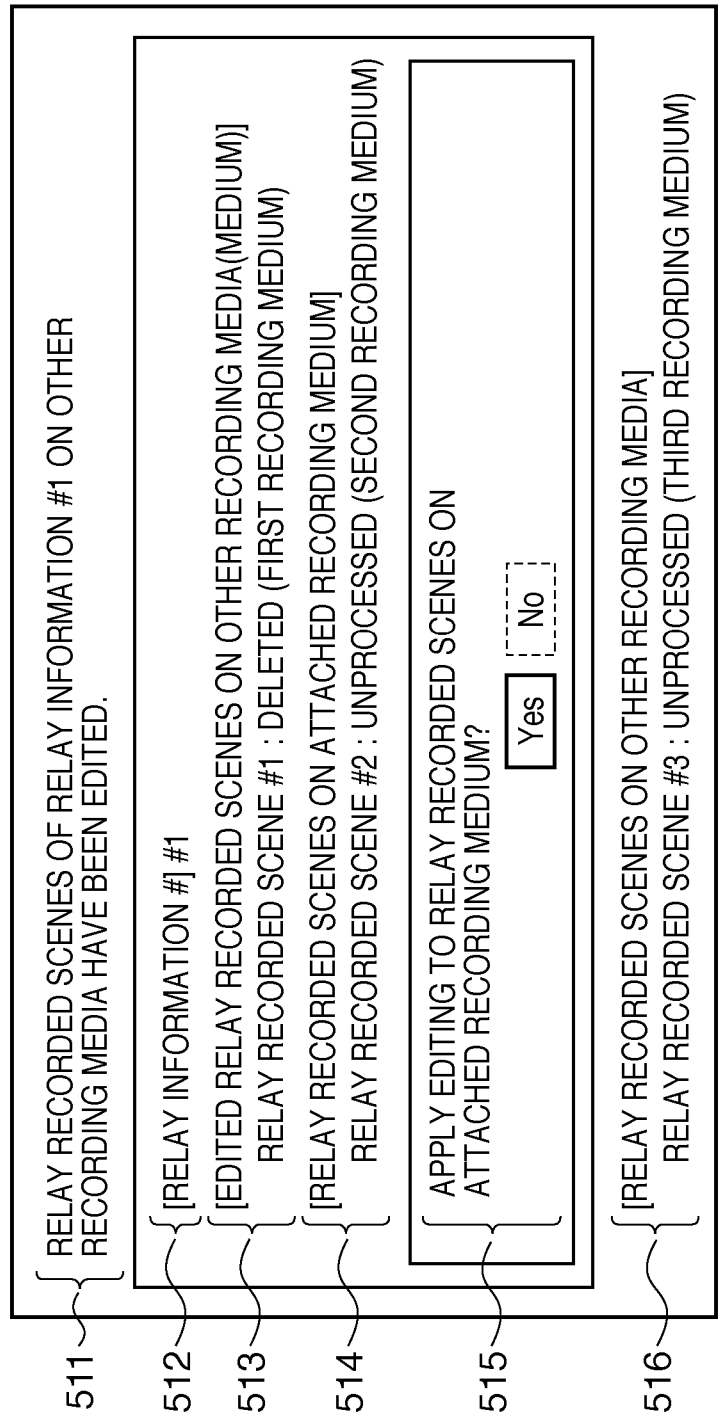

The relay information generation unit 108 also searches the relay information piece # including the editing target scene for an unprocessed relay recorded scene that has not undergone the editing processing performed in step S401, in addition to the relay recorded scene serving as the editing target scene. If an unprocessed relay recorded scene has been found, the main control unit 101 displays a confirmation screen as illustrated in FIGS. 5A and 5B by the display unit 110. On this confirmation screen is displayed information that notifies a user of whether or not to apply the content of editing (in the example of the figure, "deletion") performed on the editing target scene (in the example of the figure, the relay recorded scene #1) similarly to the "unprocessed" relay recorded scene (in the example of the figure, the relay recorded scenes #2 and #3) (step S405).

Next, the main control unit 101 determines whether or not an operation for applying the editing content has been received from the input unit 111 (step S406). If it has been determined in step S406 that an operation for applying the editing content has not been received (that is, a user has selected not to apply the editing content), the processing proceeds to step S410, which will be described later. If an operation for applying the editing content has been received in step S406, the relay information generation unit 108 references the relay recorded scene information pieces included in the relay information piece # that includes the editing target scene. It is then determined, according to the detailed information of each relay recorded scene information piece, whether or not the scene selected to apply the editing content in step S406 is editable (step S407). Here, examples of the "uneditable" case include a case where the recording medium that records the scene on which the editing content is to be reflected is not attached to the apparatus, or a state in which the recording medium cannot be accessed because, for example, its writing control switch is set to a no-writing state and such a state can be judged on the apparatus side.

In step S407, if the editing control unit 106 has determined that the scene selected by the user to reflect the editing content is uneditable, a warning screen indicating that editing is not possible is displayed by the display unit 110 (step S409), and thereafter the processing proceeds to step S410. If it has been determined in step S407 that editing is possible, the editing processing is performed on the unprocessed scene of the relay recorded scene information piece included in the relay information piece # that includes the editing target scene (step S408). The editing control unit 106 also updates the individual editing information associated with the relay information piece (step S410). Here, in processed scene information 709 included in the individual editing information, which will be described later with reference to FIGS. 7A to 7C, the editing target scene that has undergone editing in step S401 and the relay recorded scene that has undergone editing in step S408 are recorded as "processed". Note that in this case, if all relay recorded scenes included in a single relay moving image have been deleted as a result of editing, such as a case where the editing content is "deletion", the corresponding relay information piece is also deleted.

Figure 7A:
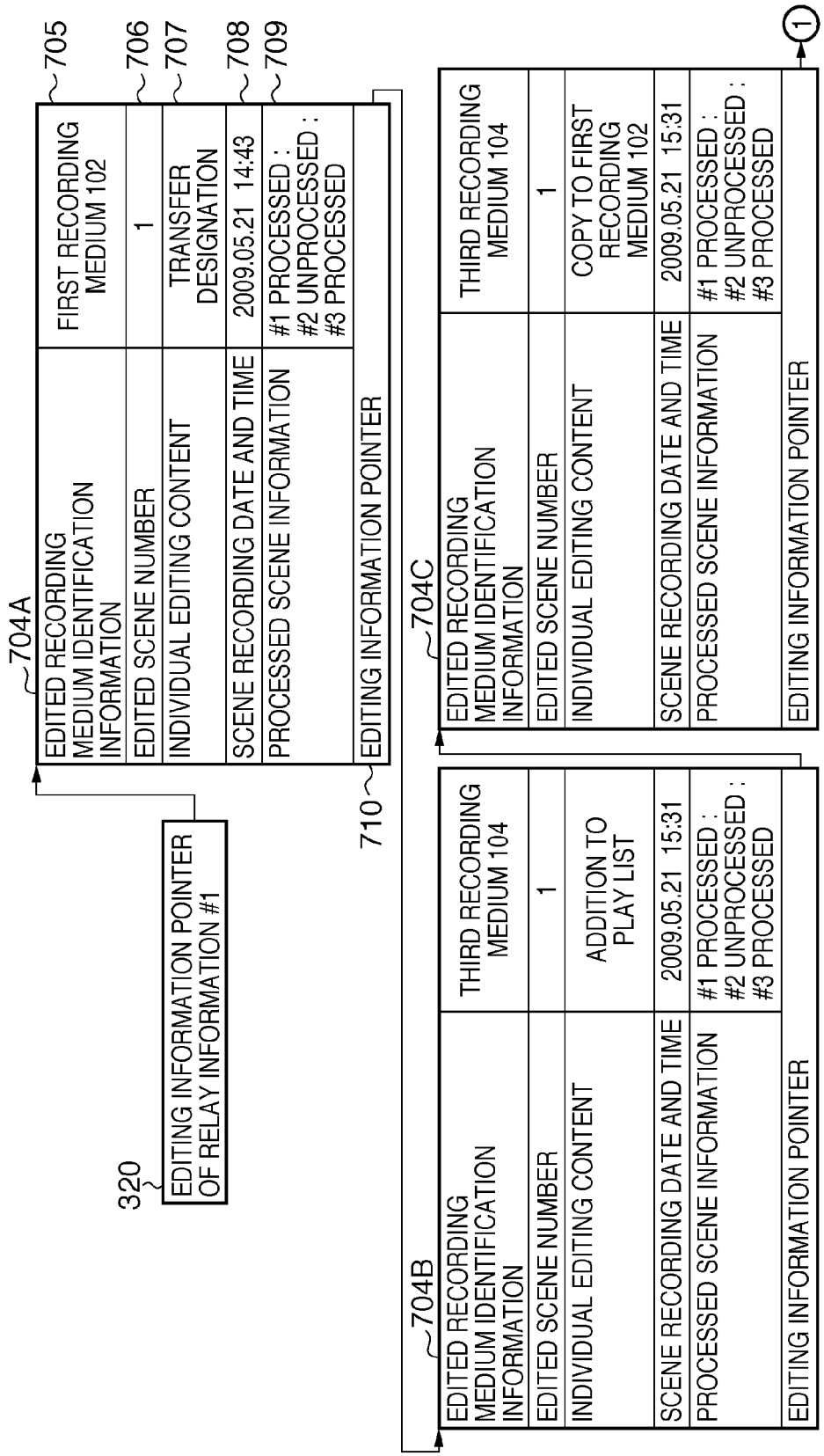
Figure 7B:
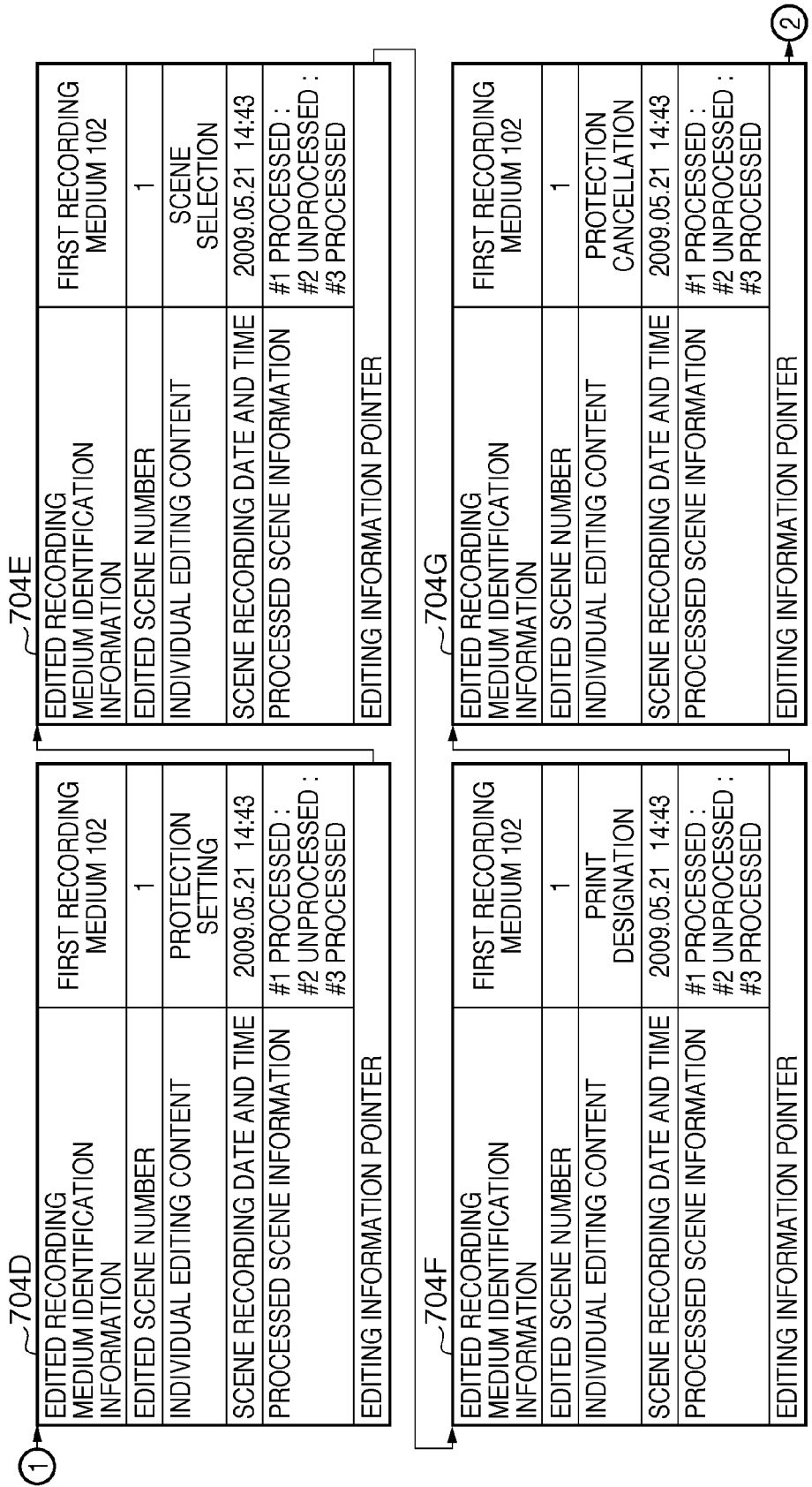

FIGS. 7A to 7C show examples of the aforementioned individual editing information generated by editing processing performed on a relay recorded scene. The number of individual editing information pieces to be associated with and recorded for each relay information piece of a single relay moving image is the number of editing processes performed. An individual editing information piece 704A shown in FIG. 7A is individual editing information regarding a relay moving image 1, which has been recorded in the relay information piece #1 (302) described above with reference to FIGS. 3A to 3C by being associated therewith by the editing information pointer 320. The individual editing information piece 704A includes edited recording medium information 705, an edited scene number 706, an individual editing content 707, a scene recording date and time 708, the processed scene information 709, and an editing information pointer 710.

The edited recording medium information 705 is information of a recording medium on which the editing target scene that has undergone the editing processing performed in step S401 of FIG. 4 is recorded. The edited scene number 706 is the number of the edited scene among the scenes recorded on the recording medium registered in the edited recording medium information 705. Since there are cases where identification cannot be made by only using the edited recording medium information 705 and the edited scene number 706, the scene recording date and time 708 of the editing target scene is registered and used as an index for checking if there is an error in the registered scene. Note that although the scene recording date and time 708 is used as an index in the present embodiment, other information such as an ID or a data size may be referenced as long as the information enables identification.

The individual editing content 707 is the content of the editing processing performed in step S401 of FIG. 4. The processed scene information 709 is scene information indicating whether or not the editing processing registered in the individual editing content 707 has been applied to the scenes registered in the relay information piece #1. The editing information pointer 710 is information for designating a location or the like where each individual editing information piece 704 has been registered, in the case where there are multiple individual editing information pieces 704.

Referring to the relay moving image indicated by the relay information piece #1 in FIGS. 7A to 7C, since "transfer designation" has been performed on the relay recorded scene #1 recorded on the first recording medium 102, the individual editing information piece 704A of the relay information piece #1 has registered therein the edited recording medium information 705 of "first recording medium 102", the edited scene number 706 of "1", the individual editing content 707 of "transfer designation", and the scene recording date and time 708 of "recording time and date of the scene #1". Furthermore, the processed scene information 709 has registered therein information indicating that "transfer designation" has been applied to the relay recorded scenes #1 and #3, but it has not been applied to the relay recorded scene #2. The editing information pointer 710 has registered therein information indicating the location where the next individual editing information piece 704B has been registered. Hereinafter, individual editing information pieces 704B to 704H are recorded similarly, which respectively indicate the editing contents of "addition to a play list", "copy to the first recording medium 102", "protection setting", "scene selection", "print designation", "protection cancellation", and "move to the first recording medium 102".

Processing Performed at Attachment of Detachable Recording Medium

Next is a description of processing performed when a detachable recording medium is attached, with reference to FIG. 6. In FIG. 6, the main control unit 101 monitors whether or not a recording medium has been attached (connected), using the attachment determination unit 105 (step S601). In the present embodiment, a detachable recording medium is either the second recording medium 103 or the third recording medium 104, so if either of them is attached after being in a state where it is not attached, it is determined that a detachable recording medium has been attached.

When the attachment of a detachable recording medium has been detected, the main control unit 101 references one of the relay information pieces stored in the relay information storage unit 109, and determines whether or not there is a relay information piece regarding a scene recorded on the attached recording medium (step S602). For example, in the case where the contents of the recorded relay information pieces are as described above with reference to FIGS. 3A to 3C and 7, if it has been determined in step S601 that the second recording medium 103 has been attached, the relay information piece #1 in FIGS. 3A to 3C is first referenced. As a result, since it can be seen that the relay recorded scene #2 registered in the relay information piece #1 is recorded on the second recording medium 103, it is determined that a scene recorded on the attached recording medium is registered in the relay information piece. If it has been determined in step S602 that the relay information piece has registered therein a scene recorded on the attached recording medium, the processing proceeds to step S603, and otherwise the processing proceeds to step S610.

In step S603, the main control unit 101 determines whether or not the referenced relay information piece #1 includes an individual editing information piece 704 (step S603). This determination can be made by referencing the number of editing information pieces 304. If it has been determined that there is an individual editing information piece, the processing proceeds to step S604, and otherwise the processing proceeds to step S610.

In step S604, the processed scene information 709 of the individual editing information piece 704 is referenced in order to determine whether or not an unprocessed scene is recorded on the detachable recording medium detected in step S601. If it has been determined that an unprocessed scene is recorded on the detachable recording medium, the processing proceeds to step S605, and otherwise the processing proceeds to step S610.

In step S605, a confirmation screen for allowing a user to select whether or not to apply the editing processing registered in the individual editing content 707 of the individual editing information piece 704 to the relay recorded scene that is indicated as "unprocessed" by the processed scene information 709 of the individual editing information piece 704 and is recorded on the detachable recording medium detected in step S601, is displayed by the display unit 110. An example of the display of this confirmation screen is shown in FIG. 5B.

FIG. 5B shows an example of the display of the confirmation screen asking for whether or not to apply editing to the unprocessed scene, displayed by the display unit 110 in step S605. A guide 511 indicates that, focusing on the relay recorded scene recorded on the attached detachable recording medium detected in step S601, another relay recorded scene of the same relay moving image (the relay moving image indicated by the relay information piece #1) that is recorded on another recording medium has been edited. A guide 512 indicates that the relay information currently being referenced is the relay information piece #1. A guide 513 indicates that the relay recorded scene #1 included in the relay information piece #1 has been edited as an editing target scene, the editing content is "deletion", and the relay recorded scene #1 is recorded on the first recording medium 102. A guide 514 indicates that the relay recorded scene #2 recorded on the attached recording medium detected in step S601 and included in the relayed scene information piece #1 has not been subjected to the "deletion" processing performed on the relay recorded scene #1 (that is, has not been processed). It can also been seen from the guide 514 that the attached recording medium detected in step S601 is the second recording medium 103.

A guide 515 asks for whether or not to apply (reflect) the same editing as that performed on the edited relay recorded scene recorded on another recording medium, to the relay recorded scene recorded on the attached recording medium. In the present example, the guide 515 asks for whether or not to apply the same editing ("deletion") processing performed on the relay recorded scene #1 recorded on the first recording medium 102 to the relay recorded scene #2 recorded on the second recording medium 103. Here, if "YES" is selected by operating the input unit 111, the relay recorded scene #2 is deleted from the second recording medium 103. If "NO" is selected by operating the input unit 111, the relay recorded scene #2 is not deleted. A guide 516 indicates that there is another relay recorded scene #3 in the relay information piece #1 that is recorded on the third recording medium 104, and the processing ("deletion") performed on the editing target scene (the relay recorded scene #1) has not been performed on this relay recorded scene #3.

Referring back to FIG. 6, it is determined in step S606 whether or not an instruction to perform editing is given. This is a determination of which answer, "YES" or "NO", has been selected by operating the input unit 111 on the guide 515 in FIG. 5B. If it has been determined that "YES" has been selected, the processing proceeds to step S607, and if "NO" has been selected, the processing proceeds to step S608.

In step S607, the editing (editing performed on the editing target scene recorded on another recording medium) indicated by the individual editing content 707 of the individual editing information piece 704 is performed on the relay recorded scene recorded on the attached recording medium and indicated as "unprocessed" by the processed scene information 709 of the individual editing information piece 704.

In step S608, the relay information is updated. If new editing processing has been performed on the unprocessed relay recorded scene in step S607, that relay recorded scene is updated to "processed" in the processed scene information 709. Furthermore, in the case where the processing performed in step S607 is "deletion" and all the relay recorded scenes included in a single relay moving image have been deleted, the relay information piece itself of that relay moving image is deleted.

In step S609, it is determined whether or not the processing of all editing information pieces has been completed. If the relay information piece currently being referenced has registered therein multiple editing information pieces and there is still an unprocessed editing information piece, the processing returns to step S605, and the processing is repeated. If the processing of all the editing information pieces included in a single relay information piece has been completed, the processing proceeds to step S610.

In step S610, it is determined whether or not the processing of all relay information pieces has been completed. That is, it is determined whether or not there is an unprocessed relay information piece stored in the relay information storage unit 109. If there is an unprocessed relay information piece, the processing returns to step S602, and the processing of the unprocessed relay information is performed. For example, in the case where the relay information piece #1 is being referenced before the processing reaches step S610 and it is determined in step S610 that there is an unprocessed relay information, the processing returns to step S602, and the processing is repeated by referencing the relay information piece #2. If it has been determined in step S610 that there is no unprocessed relay information piece, the processing ends.

As described above, in a case where editing processing is performed on a moving image in a series of relay moving images recorded across multiple recording media in a state in which one of the recording media is not attached to the apparatus, a display for reflecting the editing processing on a scene that is recorded on the unattached recording medium, as shown in FIG. 5B, is provided in response to later attachment of that recording medium. Doing this enables editing processing performed on a scene of a relay moving image recorded on one of the recording media to be reflected on another scene of the same relay moving image recorded on a newly attached one of the recording media. In this way, even if not all the recording media that record a series of relay moving images are attached at the same time, consistent editing processing can be performed on the series of relay moving images.

Note that the above description has taken the example of the case where the confirmation screen for allowing a user to select whether or not to apply the editing processing registered in the individual editing content 707 is displayed by the display unit 110 in step S605, and the editing processing is performed if the user has selected to apply the processing. However, the present invention is not intended to be limited to the above example, and other control may be performed as long as control is performed such that the editing processing registered in the individual editing content 707 is applied. For example, the editing processing registered in the individual editing content 707 may be applied without waiting for a user instruction, and a user instruction to cancel the application may be received in parallel or later on.

Furthermore, although the above description has taken the example of the case where the display for reflecting the editing processing as shown in FIG. 5B is provided in response to attachment of a recording medium, the timing of provision of the display as shown in FIG. 5B is not limited to this example. For example, the display may be provided at the time when the apparatus transitions to a specific operation mode (for example, an editing mode) after attachment of a recording medium, or may be provided at the time of receipt of an instruction to display some scenes of a relay moving image, some scenes of which that are recorded on another recording medium have been edited.

In the above-described embodiments, for example, the relay information storage unit 109 may be realized as the first recording medium 102 or as the second and/or third recording medium 103, 104. In this case, it is assumed that the second and/or third recording medium 103, 104 is attached to the apparatus.

Note that control performed by the main control unit 101 may be realized by a single piece of hardware, or may be shared by multiple pieces of hardware so as to control the overall apparatus. The present invention is not intended to be limited to these specific embodiments, and includes various forms within the scope of the gist thereof. It should also be noted that the above-described embodiments merely illustrate some embodiments of the invention, and these embodiments may be used in combination as appropriate.

Although the descriptions of the above-described embodiments have taken the example of the case where the present invention is applied to a digital video camera, the present invention is not intended to be limited thereto. The present invention is applicable to apparatuses that can edit related moving images that are recorded across multiple recording media, and is thus applicable to, for example, a PC, a digital still camera, a moving image playback apparatus such as a disk reproducing apparatus, a mobile phone, and a digital photo frame.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-162208, filed Jul. 16, 2010, which is hereby incorporated by reference herein in its entirety.

What is claimed is:

1. A moving image editing apparatus for editing a relay moving image in which one successive moving image from a start to an end of recording is recorded across a plurality of different recording media, the apparatus comprising:
- a first selection unit configured to select a scene to be edited from scenes of the moving image recorded in a first recording medium;
- a determination unit configured to determine whether or not the scene selected by the first selection unit is a part of the relay moving image;
- a second selection unit configured to select whether to perform an editing processing on another scene of the relay moving image which includes the scene selected by the first selection unit and is record in a second recording medium which is different from the first recording medium when the determination unit determines that the scene selected by the first selection unit is a part of the relay moving image;
- a storage control unit configured to control such that information of the editing processing for the other scene is stored when it is selected by the second selection unit to perform the editing processing on the other scene;
- an attachment determination unit configured to determine whether or not a detachable recording medium has been attached; and
- a control unit configured to, in a case where the attachment determination unit has determined that the second recording medium has been attached, perform control for applying the editing processing that has been stored by the storage control unit, to the other scene that is recorded on the second recording medium.

2. The moving image editing apparatus according to claim 1, wherein the control unit performs control for applying the editing processing by providing a display asking for an instruction of whether or not to apply the editing processing.

3. The moving image editing apparatus according to claim 2, wherein, in a case where editing processing has been performed by the editing unit in a state in which the second recording medium is not attached to the moving image editing apparatus, the control unit provides the display asking for an instruction of whether or not to apply the editing processing if the attachment determination unit has determined that the second recording medium has been attached.

4. The moving image editing apparatus according to claim 2, further comprising:
- a display unit configured to display a confirmation screen asking for an instruction of whether or not to apply the editing processing; and
- an input unit configured to receive a user operation for selecting whether or not to apply the editing processing through the display unit.

5. The moving image editing apparatus according to claim 1, wherein the editing processing includes processing for deleting a part of the relay moving image.

6. The moving image editing apparatus according to claim 1, wherein the editing processing includes at least one among addition to a play list, copy to another recording medium, move to another recording medium, protection setting, print designation, and protection cancellation.

7. The moving image editing apparatus according to claim 1, wherein the storage control unit performs control such that the editing processing performed by the editing unit is stored in a recording medium that is built in the moving image editing apparatus.

8. The moving image editing apparatus according to claim 7, wherein
the first recording medium is a recording medium that is built in the moving image editing apparatus, and the storage control unit performs control such that the editing processing performed by the editing unit is stored in the first recording medium.

9. The moving image editing apparatus according to claim 8, wherein the storage control unit generates and stores information indicating whether or not the editing processing performed on the part of the relay moving image recorded on the first recording medium has been applied to the part of the relay moving image recorded on the second recording medium.

10. The moving image editing apparatus according to claim 9, wherein in a case where the information becomes unnecessary as a result of application of the editing processing stored by the storage control unit to the part of the relay moving image recorded on the second recording medium, the control unit deletes the information.

11. A non-transitory computer-readable storage medium storing a program that causes a computer to function as each unit of the moving image editing apparatus according to claim 1.

12. The moving image editing apparatus according to claim 1, wherein the relay moving image is stored in the plurality of recording media as moving image file in each scene.

13. The moving image editing apparatus according to claim 1, further comprising a display control unit configured to display the other scene of the relay moving image which includes the scene selected by the first selection unit so that a scene recorded in an accessible recording medium and a scene recorded in an inaccessible recording medium are identical each other.

14. A control method for a moving image editing apparatus for editing a relay moving image in which one successive moving image from a start to an end of recording is recorded across a plurality of different recording media, the control method comprising:
- a first selection step of selecting a scene to be edited from scenes of the moving image recorded in a first recording medium;
- a determination step of determining whether or not the scene selected by the first selection unit is a part of the relay moving image;
- a second selection step of selecting whether to perform an editing processing on another scene of the relay moving image which includes the scene selected by the first selection unit and is record in a second recording medium which is different from the first recording medium when the determination unit determines that the scene selected by the first selection unit is a part of the relay moving image;
- a storage control step of controlling such that information of the editing processing for the other scene is stored when it is selected by the second selection step to perform the editing processing on the other scene;
- an attachment determination step of determining whether or not a detachable recording medium has been attached; and
- a control step of, in a case where it has been determined in the attachment determination step that the second recording medium has been attached, performing control for applying the editing processing that has been stored in the storage control step, to the other scene that is recorded on the second recording medium.

15. A moving image editing apparatus for editing a relay moving image in which one successive moving image from a start to an end of recording is recorded across a plurality of different recording media, the apparatus comprising:

a first selection unit configured to select a scene to be edited from scenes of the moving image recorded in a first recording medium;

a determination unit configured to determine whether or not the scene selected by the first selection unit is a part of the relay moving image;

a second selection unit configured to select whether to perform an editing processing on another scene of the relay moving image which includes the scene selected by the first selection unit and is record in a second recording medium which is different from the first recording medium when the determination unit determines that the scene selected by the first selection unit is a part of the relay moving image;

a storage control unit configured to control such that information of the editing processing for the other scene is stored when it is selected by the second selection unit to perform the editing processing on the other scene; and a control unit configured to perform control for applying the editing processing that has been stored by the storage control unit, to the other scene that is recorded on the second recording medium.

16. A non-transitory computer-readable storage medium storing a program that causes a computer to function as each unit of the moving image editing apparatus according to claim 15.

17. A moving image editing apparatus for editing a relay moving image in which one successive moving image from a start to an end of recording is recorded across a plurality of different recording media, the apparatus comprising:

a first selection unit configured to select a scene to be edited from scenes of the moving image recorded in a first recording medium;

a determination unit configured to determine whether or not the scene selected by the first selection unit is a part of the relay moving image;

a second selection unit configured to select whether to perform an editing processing on another scene of the relay moving image which includes the scene selected by the first selection unit and is record in a second recording medium which is different from the first recording medium when the determination unit determines that the scene selected by the first selection unit is a part of the relay moving image;

a control unit configured to perform control for applying the editing processing to the other scene that is recorded on the second recording medium.

18. A non-transitory computer-readable storage medium storing a program that causes a computer to function as each unit of the moving image editing apparatus according to claim 17.

19. A control method for a moving image editing apparatus for editing a relay moving image in which one successive moving image from a start to an end of recording is recorded across a plurality of different recording media, the control method comprising:

a first selection step of selecting a scene to be edited from scenes of the moving image recorded in a first recording medium;

a determination step of determining whether or not the scene selected by the first selection unit is a part of the relay moving image;

a second selection step of selecting whether to perform an editing processing on another scene of the relay moving image which includes the scene selected by the first selection unit and is record in a second recording medium which is different from the first recording medium when the determination unit determines that the scene selected by the first selection unit is a part of the relay moving image;

a storage control step of controlling such that information of the editing processing for the other scene is stored when it is selected by the second selection step to perform the editing processing on the other scene; and a control step of performing control for applying the editing processing that has been stored in the storage control step, to the other scene that is recorded on the second recording medium.

20. A control method for a moving image editing apparatus for editing a relay moving image in which one successive moving image from a start to an end of recording is recorded across a plurality of different recording media, the control method comprising:

a first selection step of selecting a scene to be edited from scenes of the moving image recorded in a first recording medium;

a determination step of determining whether or not the scene selected by the first selection unit is a part of the relay moving image;

a second selection step of selecting whether to perform an editing processing on another scene of the relay moving image which includes the scene selected by the first selection unit and is record in a second recording medium which is different from the first recording medium when the determination unit determines that the scene selected by the first selection unit is a part of the relay moving image;

and a control step of performing control for applying the editing processing, to the other scene that is recorded on the second recording medium.

* * * * *